United States Patent
Lumbatis

(10) Patent No.: US 11,937,108 B2
(45) Date of Patent: Mar. 19, 2024

(54) DETECTION AND MITIGATION OF WIDE BAND SIGNAL JAMMING

(71) Applicant: ARRIS Enterprises LLC, Suwanee, GA (US)

(72) Inventor: Kurt Alan Lumbatis, Dacula, GA (US)

(73) Assignee: ARRIS ENTERPRISES LLC, Horsham, PA (US)

( * ) Notice: Subject to any disclaimer, the term of this patent is extended or adjusted under 35 U.S.C. 154(b) by 250 days.

(21) Appl. No.: 17/470,457

(22) Filed: Sep. 9, 2021

(65) Prior Publication Data

US 2022/0167190 A1    May 26, 2022

Related U.S. Application Data

(60) Provisional application No. 63/116,985, filed on Nov. 23, 2020.

(51) Int. Cl.
*H04W 24/08* (2009.01)
*H04B 17/336* (2015.01)
(Continued)

(52) U.S. Cl.
CPC .......... *H04W 24/08* (2013.01); *H04B 17/336* (2015.01); *H04K 3/22* (2013.01); *H04W 4/90* (2018.02); *H04K 2203/18* (2013.01)

(58) Field of Classification Search
CPC ...... H04W 24/08; H04W 4/90; H04B 17/336; H04B 1/1027; H04K 3/22; H04K 2203/18; H04J 11/0023
(Continued)

(56) References Cited

U.S. PATENT DOCUMENTS

2003/0201934 A1\* 10/2003 Asher ............... G01S 19/21
                                                     342/357.23
2014/0038536 A1   2/2014 Welnick et al.

FOREIGN PATENT DOCUMENTS

EP    1 168 689    1/2002
EP    2 453 582    5/2012
(Continued)

OTHER PUBLICATIONS

International Search Report dated Jan. 4, 2022 in International (PCT) Application No. PCT/US2021/049629.
(Continued)

*Primary Examiner* — Don N Vo
(74) *Attorney, Agent, or Firm* — Wenderoth, Lind & Ponack, L.L.P.

(57) ABSTRACT

A wireless network device in a wide area network is disclosed. A radio of the network device receives a plurality of communication signals. The device detects a signal to noise ratio value and/or a noise floor value and determines, for each frequency channel, when one of the detected signal to noise ratio value is less than a signal to noise ratio threshold value for a period of time and/or the detected noise floor value is greater than a noise floor threshold value for the period of time. The device transmits a jamming warning signal when one of the detected signal to noise ratio value for each of the channels is determined to be greater than the signal to noise ratio threshold value for the period of time and/or the detected noise floor value for each channel is greater than the noise floor threshold value for the period of time.

9 Claims, 5 Drawing Sheets

(51) Int. Cl.
*H04K 3/00* (2006.01)
*H04W 4/90* (2018.01)

(58) Field of Classification Search
USPC .................................................. 455/1, 456.1
See application file for complete search history.

(56) References Cited

FOREIGN PATENT DOCUMENTS

| EP | 3 026 835 | 6/2016 |
|---|---|---|
| WO | 2011/011118 | 1/2011 |
| WO | 2019/028429 | 2/2019 |

OTHER PUBLICATIONS

International Preliminary Report on Patentability dated May 16, 2023 in International (PCT) Application No. PCT/US2021/049629.

* cited by examiner

DETECTION AND MITIGATION OF WIDE BAND SIGNAL JAMMING

BACKGROUND

Embodiments of the present disclosure relate to detection and mitigation of wide band signal jamming that results in loss of device connectivity over a network.

SUMMARY

Aspects of the present disclosure are drawn to a wireless network device for use with an external server configured to communicate with the wireless network device via a wide area network. The wireless network device includes a radio configured to receive a plurality of communication signals on a respective plurality channels; a memory; and a processor configured to execute instructions stored on the memory to cause the wireless device to: detect, for each of the plurality of channels, at least one of a group consisting of a signal to noise ratio value and a noise floor value; determine, for each of the plurality of channels, when at least one of the group consisting of the detected signal to noise ratio value is less than a predetermined signal to noise ratio threshold value for a predetermined period of time and the detected noise floor value is greater than a predetermined noise floor threshold value for the predetermined period of time; and transmit, to the external server via the wide area network, a jamming warning signal when at least one of the group consisting of the detected signal to noise ratio value for each of the plurality of channels is determined to be less than the predetermined signal to noise ratio threshold value for the predetermined period of time and the detected noise floor value for each of the plurality of channels is greater than the predetermined noise floor threshold value for the predetermined period of time.

In some embodiments, the radio is configured to receive the plurality of communication signals on one of a 2.4 GHz band, a 5 GHz band, a 6 GHz band, a 60 GHz band, a 900 MHz band and a 3.5 GHz band.

In some embodiments, the processor is further configured to execute instructions stored on the memory to cause the wireless network device to detect, for each of the plurality of channels, at least one of the group consisting of the signal to noise ratio value and the noise floor value; determine, for each of the plurality of channels, when at least one of the group consisting of the detected signal to noise ratio value is less than a predetermined signal to noise ratio threshold value for a predetermined period of time and the detected noise floor value is greater than a predetermined noise floor threshold value for the predetermined period of time; and transmit, to the external server via the wide area network, the jamming warning signal when at least one of the group consisting of the detected signal to noise ratio value for each of the plurality of channels is determined to be less than the predetermined signal to noise ratio threshold value for the predetermined period of time and the detected noise floor value for each of the plurality of channels is greater than the predetermined noise floor threshold value for the predetermined period of time.

Other aspects of the present disclosure are drawn to a method of using a wireless network device with an external server configured to communicate with the wireless network device via a wide area network, the method including: receiving, via a radio, a plurality of communication signals on a respective plurality channels; detecting, via a processor configured to execute instructions stored on a memory and for each of the plurality of channels, at least one of a group consisting of a signal to noise ratio value and a noise floor value; determining, via the processor and for each of the plurality of channels, when at least one of a group consisting of the detected signal to noise ratio value is less than a predetermined signal to noise ratio threshold value for a predetermined period of time and the detected noise floor value is greater than a predetermined noise floor threshold value for the predetermined period of time; and transmitting, via the processor and to the external server via the wide area network, a jamming warning signal when at least one of a group consisting of the detected signal to noise ratio value for each of the plurality of channels is determined to be greater than the predetermined signal to noise ratio threshold value for the predetermined period of time and the detected noise floor value for each of the plurality of channels is greater than the predetermined noise floor threshold value for the predetermined period of time.

In some embodiments, the receiving comprises receiving the plurality of communication signals on one of a 2.4 GHz band, a 5 GHz band, a 6 GHz band, a 60 GHz band, a 900 MHz band, and a 3.5 GHz band.

In some embodiments, the detecting comprises detecting, for each of the plurality of channels, at least one of the group consisting of the signal to noise ratio value and the noise floor value, wherein the determining comprises determining, for each of the plurality of channels, when at least one of the group consisting of the detected signal to noise ratio value is less than a predetermined signal to noise ratio threshold value for a predetermined period of time and the detected noise floor value is greater than a predetermined noise floor threshold value for the predetermined period of time, and wherein the transmitting comprises transmitting, to the external server via the wide area network, the jamming warning signal when at least one of the group consisting of the detected signal to noise ratio value for each of the plurality of channels is determined to be greater than the predetermined signal to noise ratio threshold value for the predetermined period of time and the detected noise floor value for each of the plurality of channels is greater than the predetermined noise floor threshold value for the predetermined period of time.

Other aspects of the present disclosure are drawn to a non-transitory, computer-readable media having computer-readable instructions stored thereon, the computer-readable instructions being capable of being read by a wireless network device for use with an external server configured to communicate with the wireless network device via a wide area network, wherein the computer-readable instructions are capable of instructing the wireless device to perform the method including: receiving, via a radio, a plurality of communication signals on a respective plurality channels; detecting, via a processor configured to execute instructions stored on a memory and for each of the plurality of channels, at least one of a group consisting of a signal to noise ratio value and a noise floor value; determining, via the processor and for each of the plurality of channels, when at least one of a group consisting of the detected signal to noise ratio value is less than a predetermined signal to noise ratio threshold value for a predetermined period of time and the detected noise floor value is greater than a predetermined noise floor threshold value for the predetermined period of time; and transmitting, via the processor and to the external server via the wide area network, a jamming warning signal when at least one of a group consisting of the detected signal to noise ratio value for each of the plurality of channels is determined to be greater than the predetermined signal to noise ratio threshold value for the predetermined period of time and the detected noise floor value for each of the plurality of channels is greater than the predetermined noise floor threshold value for the predetermined period of time.

In some embodiments, the computer-readable instructions are capable of instructing the wireless network device to perform the method wherein the receiving comprises receiving the plurality of communication signals on one of a 2.4 GHz band, a 5 GHz band, a 6 GHz band, a 60 GHz band, a 900 MHz band, and a 3.5 GHz band.

In some embodiments, the computer-readable instructions are the computer-readable instructions are capable of instructing the wireless network device to perform the method, wherein the detecting comprises detecting, for each of the plurality of channels, at least one of the group consisting of the signal to noise ratio value and the noise floor value, wherein the determining comprises determining, for each of the plurality of channels, when at least one of the group consisting of the detected signal to noise ratio value is less than a predetermined signal to noise ratio threshold value for a predetermined period of time and the detected noise floor value is greater than a predetermined noise floor threshold value for the predetermined period of time, and wherein the transmitting comprises transmitting, to the external server via the wide area network, the jamming warning signal when at least one of the group consisting of the detected signal to noise ratio value for each of the plurality of channels is determined to be greater than the predetermined signal to noise ratio threshold value for the predetermined period of time and the detected noise floor value for each of the plurality of channels is greater than the predetermined noise floor threshold value for the predetermined period of time.

BRIEF SUMMARY OF THE DRAWINGS

The accompanying drawings, which are incorporated in and form a part of the specification, illustrate example embodiments and, together with the description, serve to explain the principles of the present disclosure. In the drawings.

DETAILED DESCRIPTION

Figure 1:
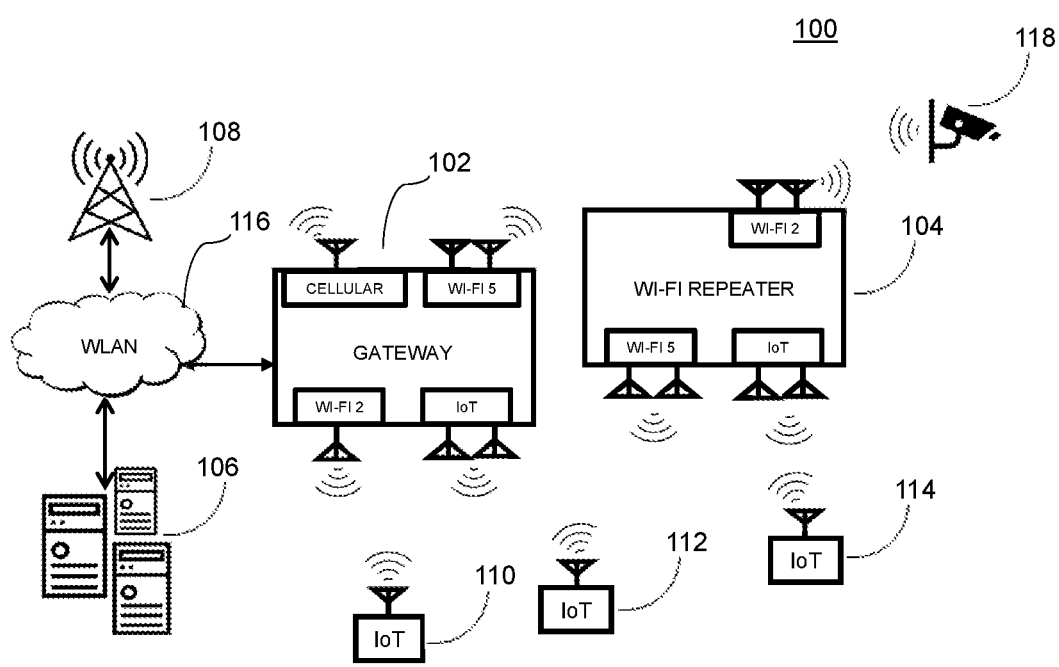
FIG. 1 illustrates a portion of a conventional network, in accordance with aspects of the present disclosure.

FIG. 1 illustrates a portion of a conventional network 100.

As shown in the figure, network 100 includes: gateway device 102; a Wi-Fi repeater device 104; one or more external servers 106; a cellular tower 108; a plurality of Internet of Things (IoT) devices, a sample of which are illustrated as an IoT device 110, an IoT device 112, and an IoT device 114; a wireless local area network (WLAN) 116; and camera 118.

A gateway device 102, also referred to as a gateway, residential gateway, or RG, is an electronic device that is to be located so as to establish a local area network (LAN) at a consumer premises. The consumer premises can include a residential dwelling, office, or any other business space of a user. The terms home, office, and premises may be used synonymously herein.

Gateway device 102 may be any device or system that is operable to allow data to flow from one discrete network to another, which in this example is from WLAN 116 in figure to an external network, e.g., the Internet. Gateway device 106 may perform such functions as web acceleration and HTTP compression, flow control, encryption, redundancy switchovers, traffic restriction policy enforcement, data compression, TCP performance enhancements (e.g., TCP performance enhancing proxies, such as TCP spoofing), quality of service functions (e.g., classification, prioritization, differentiation, random early detection (RED), TCP/UDP flow control), bandwidth usage policing, dynamic load balancing, and routing.

Gateway device 102 establishes, or is part of, WLAN 116, using Wi-Fi for example, such that IoT devices 110, 112, and 114, and camera 118 are able to communicate wirelessly with gateway device 102. The term Wi-Fi as used herein may be considered to refer to any of Wi-Fi 4, 5, 6, 6E, or any variation thereof.

Gateway device 102 serves as a gateway or access point to an external network, e.g., the Internet (or otherwise as mentioned above), for one or more devices, referred to generally herein as IoT devices 110, 112, and 114 that wirelessly communicate with gateway device 102 via, e.g., Wi-Fi. IoT devices 110, 112, and 114 can be mobile devices, smart refrigerators, smart watches, fire alarms, door lock systems, sensors, fitness trackers, smart security systems, or any other so-called internet of things equipped devices that are equipped to communicate information via WLAN 116.

Within WLAN 116, electronic devices are often referred to as being stations. In IEEE 802.11 (Wi-Fi) terminology, a station (abbreviated as STA) is a device that has the capability to use the 802.11 protocol. For example, a station may be a laptop, a desktop PC, PDA, access point or Wi-Fi phone. An STA may be fixed, mobile or portable. Generally, in wireless networking terminology, a station, wireless client, and node are often used interchangeably, with no strict distinction existing between these terms. A station may also be referred to as a transmitter or receiver based on its transmission characteristics. IEEE 802.11-2012 defines station as: a logical entity that is a singly addressable instance of a medium access control (MAC) and physical layer (PHY) interface to the wireless medium (WM).

Cellular tower 108 may be a conventional base transceiver station (BTS) which serves a coverage area. Cellular tower 108 may provide communications with gateway device 102 and external servers 106 by way of the one or more cellular communications subsystems (not shown). Cellular tower 108 may further facilitate for a variety of mobile data communication networks, such as Mobitex™, DataTAC™, General Packet Radio Service (GPRS), voice communication networks, such as Advanced Mobile Phone Service (AMPS), Time Division Multiple Access (TDMA), Code Division Multiple Access CDMA, Personal Communications Service (PCS), or Global System for Mobile Communications (GSM).

Conventional residential networks, such as network 100, may be designed and deployed to support devices which allow home security systems including sensors, cameras, and other control entities. These support devices may communicate their data wirelessly to a central access point or controller to gather sensor data and/or relay video or other information to the WLAN 116 and/or other cloud based monitoring systems. Such a wireless network may be susceptible to wide band channel interference, whether malicious or incidental, which may interfere with the operation of the network.

Further, gateway device 102 may contain multiple radios, which operate at differing frequencies and utilize differing communications protocols such as IEEE 802.11, BlueToothLE (BLE) Zigbee, Thread, LoRAWAN, Z-Wave and/or other TOT protocols. However, each of these radios, despite their operational protocols, may utilize specific frequency bands, e.g., 2.4 GHz ISM band, 5 GHz band, 900 MHz band 3.5 MHz band, etc. Further, such conventional network arrangements may be utilized to provide various over the top critical services which may include telemedicine, home security, aging in place, health monitoring, and the like which could be adversely affected by a loss of signal to the root devices. Each of the radios in such a deployment requires a certain Signal to Noise Ratio (SNR) in order to communicate with its base radio connection point to the wide area network or particular control ecosystem. As such, these systems could be susceptible to interference (either incidental or malicious) which may disrupt these communications. When these devices are being utilized for home security systems, a malicious attack could be launched to disrupt data communications in order to disrupt an alert to authorities. When such devices are being utilized to monitor health conditions, loss of connectivity could lead to a life-threatening situation.

What is needed is a system and method for detection and mitigation of wide band signal jamming.

A system and method in accordance with the present disclosure solves the problem of signal jamming in wide band networks.

In accordance with the present disclosure, a radio of a network device receives a plurality of communication signals. The network device determines a noise floor value (measured in dBm or other standard measurement) for each of the received plurality of communication signals, wherein the noise floors is the signal created from adding up all the unwanted signals. The network device then determines a signal to noise ratio (SNR) based on the amplitude of the detected signal (measured in dBm or other standard measurement) and the determined noise floor value. The network device then determines, for each frequency channel, when one of the detected SNR value is greater than a SNR threshold value for a period of time and/or the detected noise floor value is greater than a noise floor threshold value for the period of time. The device transmits a jamming warning signal when the detected SNR value for each of the channels is determined to be greater than the SNR threshold value for the period of time and/or the detected noise floor value for each channel is greater than the noise floor threshold value for the period of time.

Such a method and system may ensure that malicious as well as unintentional jamming of signals to hinder communications between devices, are mitigated. The computation of SNR and the noise floor value for each frequency band may be an easy yet effective technique to guarantee that attempts to disarm the communications between various devices in a home network are thwarted.

The following detailed description is made with reference to the accompanying drawings and is provided to assist in a comprehensive understanding of various example embodiments of the present disclosure. The following description includes various details to assist in that understanding, but these are to be regarded merely as examples and not for the purpose of limiting the present disclosure as defined by the appended claims and their equivalents. The words and phrases used in the following description are merely used to enable a clear and consistent understanding of the present disclosure. In addition, descriptions of well-known structures, functions, and configurations may have been omitted for clarity and conciseness. Those of ordinary skill in the art will recognize that various changes and modifications of the examples described herein can be made without departing from the spirit and scope of the present disclosure.

An example system and algorithm to be executed by a processor for detection and mitigation of signal jamming in a wide band network, in accordance with aspects of the present disclosure will now be described in greater detail with reference to FIGS. 2-4.

Figure 2:
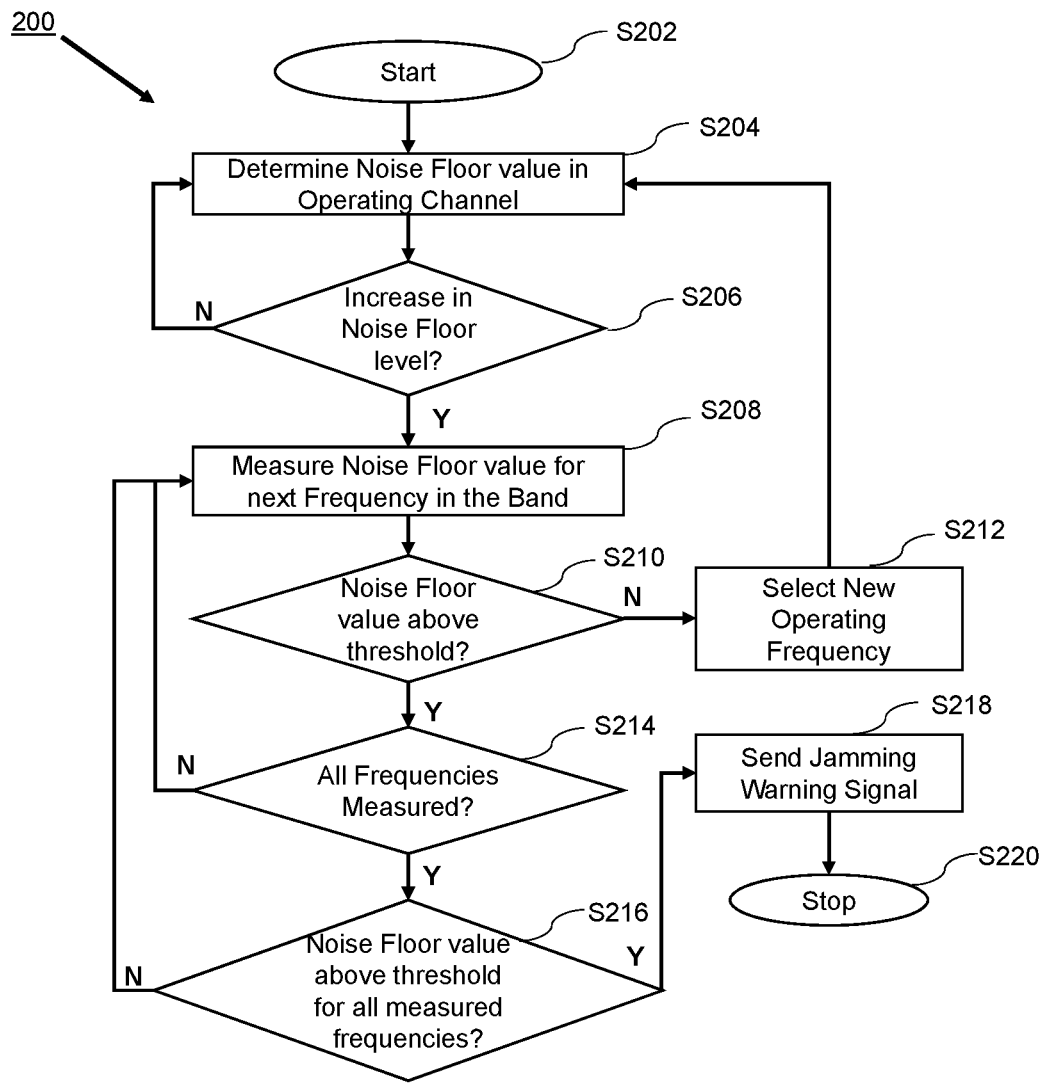
FIG. 2 illustrates an algorithm to be executed by a processor for detection of a jamming signal on a wide band network, in accordance with aspects of the present disclosure.

FIG. 2 illustrates an algorithm 200 for detection of a signal jamming attempt, in accordance with aspects of the present disclosure.

As shown in the figure, algorithm 200 as executed by a processor starts (S202) and a noise floor value in an operating channel may be determined (S204). For example, a home network controller (HNC) may be configured to determine the noise floor value. An example HNC, operating within a home security system 300, will now be described in greater detail with reference to FIG. 3.

Figure 3:
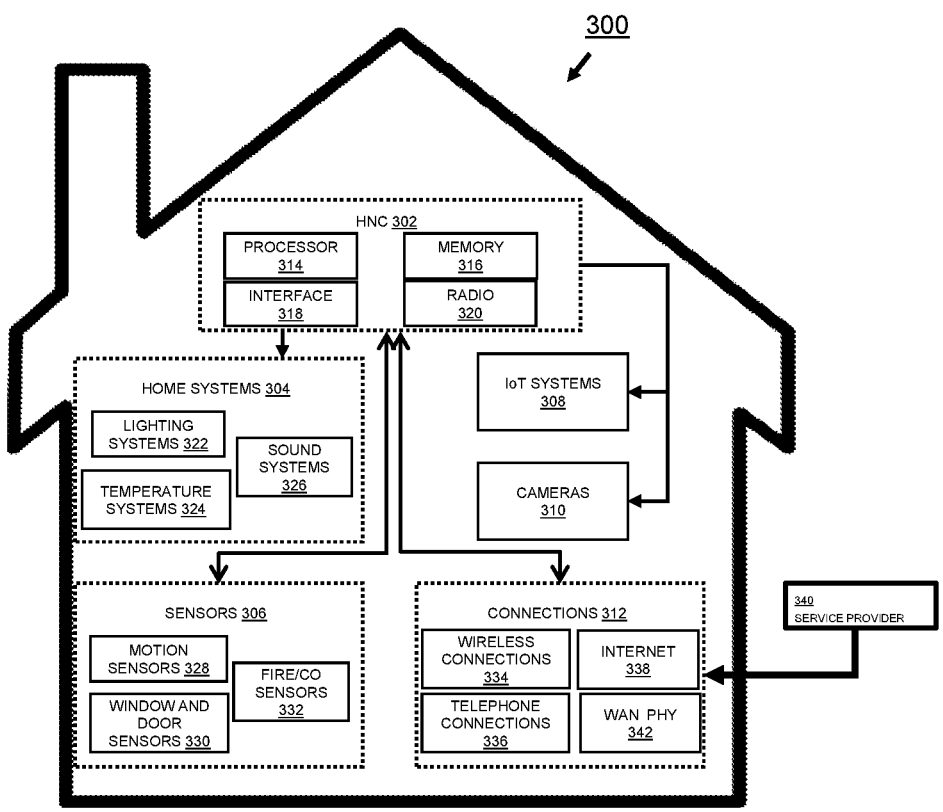
FIG. 3 illustrates components of a home security system, in accordance with aspects of the present disclosure.

FIG. 3 illustrates a home security system 300, in accordance with aspects of the present disclosure.

As shown in FIG. 3, the home security system 300 includes: a HNC 302; one or more home systems 304; sensors 306; IoT systems 308; cameras 310; and connections 312. The HNC 302 may include a processor 314, a memory 316, an interface 318, and a radio 320.

Processor 314 may include a dedicated control circuit, CPU, a hardware processor such as a microprocessor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software for controlling the operation and functions of the HNC 302, in accordance with the embodiments described in the present disclosure.

Memory 316 can store various programming, and user content, and data.

Radio 320, such as a Wi-Fi WLAN interface radio transceiver, is operable to communicate with home systems 304, IoT systems 308, cameras 310, and sensors 306, via connections 312 as shown in FIG. 3. Radio 320 includes one or more antennas and communicates wirelessly via one or more of the 2.4 GHz band, the 5 GHz band, the 6 GHz band, and the 60 GHz band, or at the appropriate band and bandwidth to implement any IEEE 802.11 Wi-Fi protocols, such as the Wi-Fi 4, 5, 6, or 6E protocols.

Interface 318 may include one or more connectors, such as RF connectors, or Ethernet connectors, and/or wireless communication circuitry, such as 5G circuitry and one or more antennas. Interface 318 receives content from service provider 340 (as shown in FIG. 3) by known methods, non-limiting examples of which include terrestrial antenna, satellite dish, wired cable, DSL, optical fibers, or 5G as discussed above. Through interface 318, HNC 302 receives an input signal, including data and/or audio/video content, from service provider 340 and can send data to service provider 340.

In this example, processor 314, memory 316, interface circuit 318, and radio 320 are illustrated as individual devices. However, in some embodiments, at least two of processor 314, memory 316, interface circuit 318, and radio 320, be combined as a unitary device. Whether as individual devices or as combined devices, processor 314, memory 316, interface circuit 318, and radio 320 may be implemented as any combination of an apparatus, a system and an integrated circuit. Further, in some embodiments, at least one of processor 314, memory 316, and interface circuit 318 may be implemented as a computer having non-transitory computer-readable media for carrying or having computer-executable instructions or data structures stored thereon. Such non-transitory computer-readable recording medium refers to any computer program product, apparatus or device, such as a magnetic disk, optical disk, solid-state storage device, memory, programmable logic devices (PLDs), DRAM, RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Disk or disc, as used herein, includes compact disc (CD), laser disc, optical disc, digital versatile disc (DVD), floppy disk and Blu-ray disc. Combinations of the above are also included within the scope of computer-readable media. For information transferred or provided over a network or another communications connection (either hardwired, wireless, or a combination of hardwired or wireless) to a computer, the computer may properly view the connection as a computer-readable medium. Thus, any such connection may be properly termed a computer-readable medium. Combinations of the above should also be included within the scope of computer-readable media.

Example tangible computer-readable media may be coupled to a processor such that the processor may read information from and write information to the tangible computer-readable media. In the alternative, the tangible computer-readable media may be integral to the processor. The processor and the tangible computer-readable media may reside in an integrated circuit (IC), an application specific integrated circuit (ASIC), or large scale integrated circuit (LSI), system LSI, super LSI, or ultra LSI components that perform a part or all of the functions described herein. In the alternative, the processor and the tangible computer-readable media may reside as discrete components.

Example tangible computer-readable media may be also be coupled to systems, non-limiting examples of which include a computer system/server, which is operational with numerous other general purposes or special purpose computing system environments or configurations. Examples of well-known computing systems, environments, and/or configurations that may be suitable for use with computer system/server include, but are not limited to, personal computer systems, server computer systems, thin clients, thick clients, handheld or laptop devices, multiprocessor systems, microprocessor-based systems, set-top boxes, programmable consumer electronics, network PCs, minicomputer systems, mainframe computer systems, and distributed cloud computing environments that include any of the above systems or devices, and the like.

Such a computer system/server may be described in the general context of computer system-executable instructions, such as program modules, being executed by a computer system. Generally, program modules may include routines, programs, objects, components, logic, data structures, and so on that perform particular tasks or implement particular abstract data types. Further, such a computer system/server may be practiced in distributed cloud computing environments where tasks are performed by remote processing devices that are linked through a communications network. In a distributed cloud computing environment, program modules may be located in both local and remote computer system storage media including memory storage devices.

Components of an example computer system/server may include, but are not limited to, one or more processors or processing units, a system memory, and a bus that couples various system components including the system memory to the processor.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

A program/utility, having a set (at least one) of program modules, may be stored in the memory by way of example, and not limitation, as well as an operating system, one or more application programs, other program modules, and program data. Each of the operating system, one or more application programs, other program modules, and program data or some combination thereof, may include an implementation of a networking environment. The program modules generally carry out the functions and/or methodologies of various embodiments of the application as described herein.

The home security system 300, as depicted by FIG. 3, may be set up in a typical residential area having a property area, a main entrance, and a home area (not shown).

The home systems 304 may include lighting systems 322, temperature systems 324, and sound systems 326. The lighting systems 322 may be configured in a manner that it makes an entrance area of the home suitably lit for walking whilst allowing the cameras 310 to take pictures of people entering and exiting the main entrance. Further, the lighting systems 322 and the sound systems 326 may be used for personal home use and/or as a part of the home security system 300. For example, the lighting systems 322 may provide lighting controls for bedrooms, common areas, bathrooms, and outside areas of the home in a typical private use setting. Similarly, the sound systems 326 may be configured to control sounds emanating from speakers, televisions, and other entertainment devices, as well as configured to control IoT systems 308 by means of a plurality of voice controls. In another example, the lighting system 322 may be used by the home security system 300 to enhance visibility of entrances and driveways, in order to ensure that facial recognition of people entering the house, especially during the evening and nighttime, is facilitated using the cameras 310. Further, the sound systems 326 may be configured to identify various sound signals received from areas surrounding the home area and notify the HNC 302 of any sounds that may be unrecognized or otherwise preconfigured as sounds that trigger a notification. The temperature systems 324 may be configured to automatically detect and adjust temperature settings of the home, based on one or more signals received from the processor 314. The temperature systems 324 may also be configured to detect abnormal changes in temperatures within the home area and transmit a notification to the processor 314 indicating such abnormal changes.

The sensors 306 may include motion sensors 328, window and door sensors 330, and fire/CO sensors 332. The motion sensors 328 may be configured to monitor an approach to the property area for providing a primary input signal to the processor 314 for reactive real-life simulating. The motion sensors 328, such as infrared sensors, may be configured to detect entrance of people to the main entrance and transmitting an entrance input signal to the processor 314. The cameras 310 may be configured to record video on receiving a command from the processor 314, based on the entrance input signal from the motion sensors 328 to the processor 314. In some embodiments, the window and door sensors 330 may provide an unauthorized intrusion signal to the home area, for the processor 314, which may be used as the intrusion input for the home security system 300. The window and door sensors 330 may be configured to detect an unauthorized intrusion to the home area and transmit an illegal intrusion input signal to the processor 314. In an embodiment, the processor 314, in response to receiving the illegal intrusion signal, may transmit a command to the sound systems 326 to generate an alarm and/or a notification may be sent to a user device indicating such illegal intrusion. The fire/CO sensors 332 may be configured to detect smoke and/or levels of carbon monoxide in the home area, and transmit a warning signal to the processor 314 in case of detection of smoke or when levels of carbon monoxide exceed a preset limit. In some embodiments, the sensors 306 may be enabled or disabled through the HNC 302, depending on whether the home security system 300 is fully armed, partial armed, or fully disarmed.

The IoT systems 308 may be configured to interconnect the home systems 304, the sensors 306, and the cameras 310, via the connections 312, in order to facilitate automatic and smart connectivity between multiple home devices. For instance, based on the signals received from sound systems 326 and temperature systems 324, IoT systems 308 may transmit a request to the processor 314, to adjust the ambient temperature of the home area. In another example, IoT systems 308 may generate a report on all electronic appliances equipped within the residential area and transmit said report to the HNC 302 for recording and maintenance purposes.

The connections 312 may include wireless connections 334 to wirelessly connect via known wireless protocols, telephone connections 336 to connect to wired and cellular public switched data networks (PSDN), WAN Connections 342, and Internet connections 338 to connect to the Internet through known network protocols. It should be noted that connections 312 may additionally include any other known connections that may be required for network communications external to the home, non-limiting examples of which include Data Over Cable Service Interface Specifications (DOCSIS) connections, digital subscriber line (DLS) connections, fiber connections, etc.

Service provider 340 includes head-end equipment such as server computers (e.g., automatic configuration server ACS, cable modem termination system CMTS) that enable a content provider, such as a cable television provider, a satellite television provider, an internet service provider, or multiple-systems operator (MSO), to provide content (such as audio/video content and/or internet service) either through a coaxial network, an optical fiber network, and/or DSL, or wireless network 110, such as a satellite or terrestrial antenna implemented network or a combination of any of these examples or their equivalents. The data communicated on such network can be implemented using a variety of protocols on a network such as a wide area network (WAN), a virtual private network (VPN), metropolitan area networks (MANs), system area networks (SANs), a DOCSIS network, a fiber optics network (e.g, FTTH (fiber to the home), FTTX (fiber to the X), or hybrid fiber-coaxial (HFC)), a digital subscriber line (DSL), a public switched data network (PSDN), a global Telex network, or a 2G, 3G, 4G or 5G, for example.

Returning to FIG. 2, it may be determined whether there is an increase in a level of the noise floor value (S206). If there is no increase in the level of the noise floor value (N at S206), then algorithm 200 again determines the noise floor value for the operating channel (S204). An example representation of a noise floor value and signal to noise ratio (SNR) value measurement is depicted in FIGS. 4A and 4B.

Figure 4A:
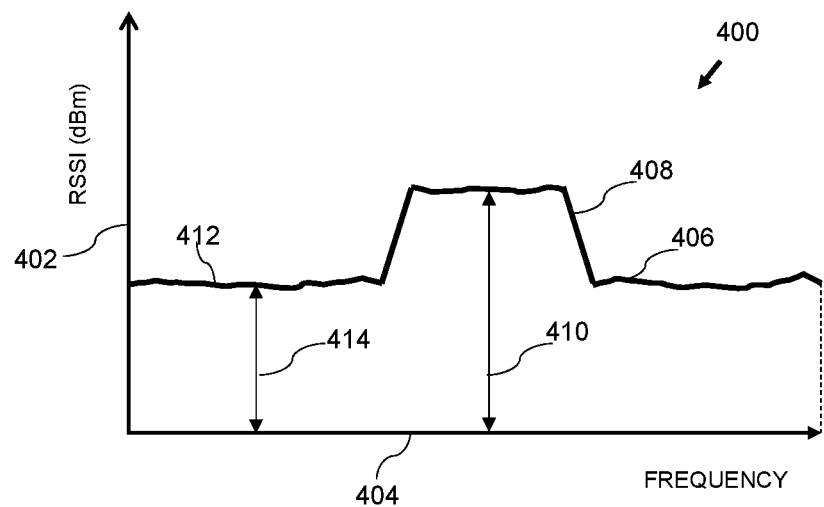
FIG. 4A illustrates a graphical representation of values of noise floor and signal to noise ratios, in accordance with aspects of the present disclosure.
Figure 4B:
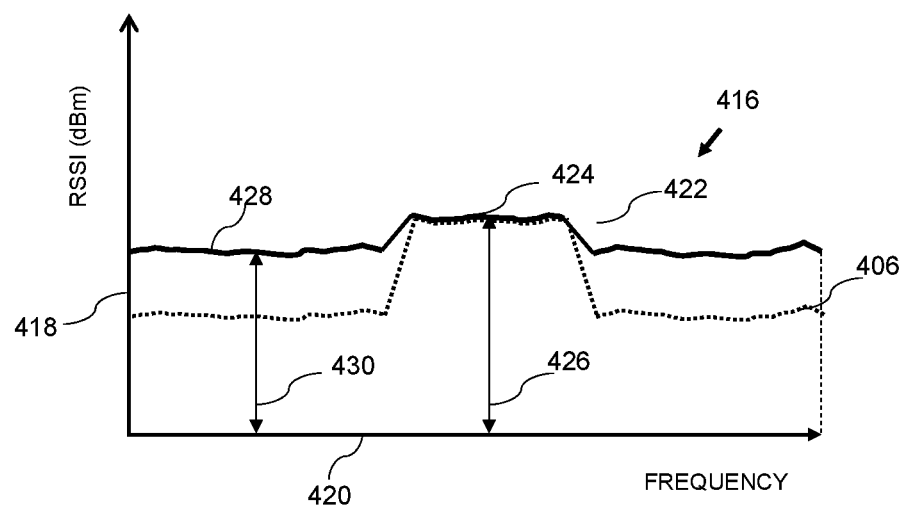
FIG. 4B illustrates another graphical representation of values of noise floor and signal to noise ratios, in accordance with aspects of the present disclosure.

FIG. 4A illustrates a graphical representation 400 of a noise floor and SNR measurement, in accordance with aspects of the present disclosure.

As shown in the figure, the graphical representation 400 consists of a y-axis 402 for plotting a received signal strength value, measured in decibel-milliwatts (dBm). The graphical representation 400 further consists of an x-axis 404 for plotting a value for frequency. In an example shown in the figure, a detected signal 406, as measured by the HNC 302, comprises a data portion 408, having an amplitude 410 and a noise floor 412 having an amplitude 414.

In operation of the home security system 300, the amplitude 410 of the data portion 408 and the amplitude 414 of the noise floor 412 may be periodically monitored by HNC 302 to obtain an SNR value. In an embodiment, predetermined threshold values for SNR and noise floor 412 may be set by the HNC 302 that may be indicative of a normal operation of home security system 300. Further, for each frequency in an operating channel, the values for SNR and noise floor 412 may be continually monitored until a decrease in the level of SNR or an increase in the level of noise floor 412 is detected.

Returning to FIG. 2, if it is determined that there is an increase in the level of the noise floor value (Y at S206), then algorithm 200 may measure the noise floor value for a next frequency in the band (S208).

FIG. 4B illustrates a graphical representation 416 depicting an increased noise floor value with respect to an SNR value, in accordance with aspects of the present disclosure.

As depicted in the figure, the graphical representation 416 consists of a y-axis 418 for plotting a received signal strength (RSSI) value, measured in decibel-milliwatts (dBm). The graphical representation 418 further consists of an x-axis 420 for plotting a value for frequency. In an example shown in the figure, a detected signal 422, as measured by the HNC 302, comprises a data (SNR) portion 424, having an amplitude 426 and a noise floor 428 having an amplitude 430. The detected signal 406, depicted by a dotted line, as plotted using the graphical representation 400 of FIG. 4A, is also shown for comparison.

In the example shown in FIG. 4B, the amplitude 430 for the noise floor 428 is greater than the amplitude 414 for the noise floor 412, as described earlier in FIG. 4A, and herein depicted using dotted line 406. Such an increase in the amplitude of the noise floor value may be indicative that there may be a potential threat to the home security system 300 and therefore further analysis may be performed by HNC 302. Further, although the amplitude 426 for SNR 424 and amplitude 410 for SNR 408 are shown as equal in FIGS. 4A and 4B, in one embodiment, there may be also be a detection of decrease in amplitude 426 of the SNR 424 as compared to previously calculated amplitude 410. The decrease in amplitudes of the SNR signals may also be indicative of a threat of a potential wide band jamming signal.

Returning to FIG. 2, the algorithm 200 may determine whether the noise floor value is above a predetermined threshold value (S210). If the noise floor value is above the predetermined threshold value (N at S210), the algorithm 200 may select a new operating frequency (S212). The algorithm 200 may then again determine the noise floor value in the new operating channel (S204).

In some embodiments, if it is determined by HNC 302 that the amplitude 430 of the noise floor 428 does not exceed the predetermined threshold value, processor 314 may select a new operating frequency and maintain periodic detection of noise floor values. Similar detection may also be performed for the SNR values. Otherwise, if the amplitude 430 of the noise floor 428 is determined to be above the predetermined threshold (Y at S210), it may be determined if values for noise floor have been determined for all operating frequencies (S214). If the values for noise floor have not been measured for all frequencies (N at S214), the algorithm 200 may again measure a noise floor value for the next frequency band (S208).

Further, if the noise floor value has been measured for all frequencies (Y at S214), it may be determined if the noise floor value is above the predetermined threshold for all of said frequencies (S216). If it is determined that the noise floor value is not above the predetermined value (N at S216) for all of said frequencies, the algorithm 200 again measures noise floor value for the next frequency band (S208).

Otherwise, if it is determined that the noise floor value is greater than the predetermined value (Y at S216), the algorithm 200 sends a jamming warning signal (S218). The algorithm then stops (S220). The jamming warning signal, in an embodiment, may be transmitted by processor 314 to one or more of the external servers 106 through connections 312. In an example, the jamming warning signal may be transmitted by processor 314 via a wired connection, such as the telephone connections 336 or WAN PHY or through wireless connections, such as the wireless connections 334.

A person ordinarily skilled in the art shall appreciate that the aforementioned algorithm 200 may be used by HNC 302 with respect to detection of changes in values for noise floor, SNR, and/or a combination of noise floor and SNR values, for various frequency bands in an operating channel.

The foregoing description of various preferred embodiments have been presented for purposes of illustration and description. It is not intended to be exhaustive or to limit the present disclosure to the precise forms disclosed, and obviously many modifications and variations are possible in light of the above teaching. The example embodiments, as described above, were chosen and described in order to best explain the principles of the present disclosure and its practical application to thereby enable others skilled in the art to best utilize the present disclosure in various embodiments and with various modifications as are suited to the particular use contemplated. It is intended that the scope of the present disclosure be defined by the claims appended hereto.

What is claimed is:

1. A wireless network device for use with an external server configured to communicate with said wireless network device via a wide area network, said wireless network device comprising:

a radio configured to receive a plurality of communication signals on a respective plurality channels;

a memory; and a processor configured to execute instructions stored on said memory to cause said wireless network device to:

detect, for each of the plurality of channels, at least one of a group consisting of a signal to noise ratio value and a noise floor value;

determine, for each of the plurality of channels, when at least one of one of the group of the detected signal to noise ratio value is less than a predetermined signal to noise ratio threshold value for a predetermined period of time and the detected noise floor value is greater than a predetermined noise floor threshold value for the predetermined period of time; and transmit, to the external server via the wide area network, a jamming warning signal when at least one of the group consisting of the detected signal to noise ratio value for each of the plurality of channels is determined to be greater than the predetermined signal to noise ratio threshold value for the predetermined period of time and the detected noise floor value for each of the plurality of channels is greater than the predetermined noise floor threshold value for the predetermined period of time.

2. The wireless network device of claim 1, wherein said radio is configured to receive the plurality of communication signals on one of a 2.4 GHz band, a 5 GHz band, a 6 GHz band, a 60 GHz band, a 900 MHz band and a 3.5 GHz band.

3. The wireless network device of claim 1, wherein the jamming warning signal is transmitted via a telephone connection, a wireless connection, or both.

4. A method of using a wireless network device with an external server configured to communicate with the wireless network device via a wide area network, said method comprising:

receiving, via a radio, a plurality of communication signals on a respective plurality channels;

detecting, via a processor configured to execute instructions stored on a memory and for each of the plurality of channels, at least one of a group consisting of a signal to noise ratio value and a noise floor value;

determining, via the processor and for each of the plurality of channels, when at least one of the group consisting of the detected signal to noise ratio value is less than a predetermined signal to noise ratio threshold value for a predetermined period of time and the detected noise floor value is greater than a predetermined noise floor threshold value for the predetermined period of time; and transmitting, via the processor and to the external server via the wide area network, a jamming warning signal when at least one of the group consisting of the detected signal to noise ratio value for each of the plurality of channels is determined to be greater than the predetermined signal to noise ratio threshold value for the predetermined period of time and the detected noise floor value for each of the plurality of channels is greater than the predetermined noise floor threshold value for the predetermined period of time.

5. The method of claim 4, wherein said receiving comprises receiving the plurality of communication signals on one of a 2.4 GHz band, a 5 GHz band, a 6 GHz band, a 60 GHz band, a 900 MHz band and a 3.5 GHz band.

6. The method of claim 4, wherein the jamming warning signal is transmitted via a telephone connection, a wireless connection, or both.

7. A non-transitory, computer-readable media having computer-readable instructions stored thereon, the computer-readable instructions being capable of being read by a wireless network device for use with an external server configured to communicate with the wireless network device via a wide area network, wherein the computer-readable instructions are capable of instructing the wireless network device to perform the method comprising:

receiving, via a radio, a plurality of communication signals on a respective plurality channels;

detecting, via a processor configured to execute instructions stored on a memory and for each of the plurality of channels, at least one of a group consisting of a signal to noise ratio value and a noise floor value;

determining, via the processor and for each of the plurality of channels, when at least one of the group consisting of the detected signal to noise ratio value is less than a predetermined signal to noise ratio threshold value for a predetermined period of time and the detected noise floor value is greater than a predetermined noise floor threshold value for the predetermined period of time; and transmitting, via the processor and to the external server via the wide area network, a jamming warning signal when at least one of the group consisting of the detected signal to noise ratio value for each of the plurality of channels is determined to be greater than the predetermined signal to noise ratio threshold value for the predetermined period of time and the detected noise floor value for each of the plurality of channels is greater than the predetermined noise floor threshold value for the predetermined period of time.

8. The non-transitory, computer-readable media claim 7, wherein the computer-readable instructions are capable of instructing the wireless network device to perform the method wherein said receiving comprises receiving the plurality of communication signals on one of a 2.4 GHz band, a 5 GHz band, a 6 GHz band, a 60 GHz band, a 900 MHz band and a 3.5 GHz band.

9. The non-transitory, computer-readable media claim 7, the jamming warning signal is transmitted via a telephone connection, a wireless connection, or both.

* * * * *